United States Patent
Chao et al.

(10) Patent No.: US 9,907,139 B2
(45) Date of Patent: Feb. 27, 2018

(54) LED CONTROLLER

(71) Applicant: MIKPower, Inc., Campbell, CA (US)

(72) Inventors: Thomas Chao, Cupertino, CA (US); John Huang, San Jose, CA (US)

(73) Assignee: MIKPOWER, Inc., San Jose, CA (US)

(*) Notice: Subject to any disclaimer, the term of this patent is extended or adjusted under 35 U.S.C. 154(b) by 0 days.

(21) Appl. No.: 14/822,844

(22) Filed: Aug. 10, 2015

(65) Prior Publication Data

US 2015/0351193 A1  Dec. 3, 2015

Related U.S. Application Data

(63) Continuation-in-part of application No. 13/178,336, filed on Jul. 7, 2011, now Pat. No. 9,107,258.

(60) Provisional application No. 61/362,231, filed on Jul. 7, 2010.

(51) Int. Cl.
H05B 37/02 (2006.01)
H05B 33/08 (2006.01)

(52) U.S. Cl.
CPC ....... *H05B 33/0887* (2013.01); *H05B 33/083* (2013.01); *H05B 33/0812* (2013.01); *H05B 33/0845* (2013.01)

(58) Field of Classification Search
CPC ............ H05B 33/0887; H05B 33/083; H05B 33/0812; H05B 33/0845; H05B 37/02; H05B 37/032; H05B 37/036
USPC ..... 315/122, 185 R, 185 S, 200 R, 205, 291, 315/297, 300
See application file for complete search history.

(56) References Cited

U.S. PATENT DOCUMENTS 9,288,862 B2 * 3/2016 Kim ................... H05B 33/083
2008/0094000 A1 * 4/2008 Yamamoto ......... H05B 33/0803
315/250

* cited by examiner

*Primary Examiner* — Jimmy Vu
*Assistant Examiner* — Henry Luong
(74) *Attorney, Agent, or Firm* — Thomas C. Chan; Silicon Valley Patent Group LLP

(57) ABSTRACT

Methods and circuits for controlling LEDs are disclosed. In one embodiment, a multistage driver for driving a plurality of serially connected LEDs includes a voltage regulator circuit configured to receive a rectified AC voltage, where the voltage regulator circuit includes a depletion device configured to generate a unregulated voltage using the rectified AC voltage, a band gap voltage reference circuit configured to generate a plurality of reference voltages using the unregulated voltage, and a current setting circuit configured to control the plurality of serially connected LEDs using the plurality of reference voltages.

10 Claims, 11 Drawing Sheets

LED CONTROLLER

CROSS REFERENCE TO RELATED APPLICATIONS

This application is a continuation-in-part of U.S. non-provisional application Ser. No. 13/178,336, "A LED Controller" filed Jul. 7, 2011, which claims the benefit of U.S. provisional application No. 61/362,231, "A LED Controller" filed Jul. 7, 2010. The aforementioned United States applications are hereby incorporated by reference in their entirety.

FIELD OF THE INVENTION

The present invention relates to the field of electronics. In particular, the present invention relates to methods and circuits for controlling light emitting diodes (LEDs).

BACKGROUND OF THE INVENTION

Conventional LED controllers are typically powered by direct current. Because of this limitation, their applications are limited as they would be battery powered or would require conversion of power produced in other forms to direct current. To work with an alternating current power source, conventional LED controllers would require a power adaptor as a transformer, which increases the cost and limits the usage of LEDs. Therefore, there is a need for an improved LED controller that addresses the limitations of the conventional LED controllers.

SUMMARY

Methods and circuits for controlling LEDs are disclosed. In one embodiment, a light emitting diode (LED) integrated circuit controller includes a voltage regulator circuit configured to operate with an alternating current (AC) power source, where the voltage regulator circuit includes a depletion device configured to receive a varying AC voltage and to generate a unregulated voltage, and a band gap voltage reference circuit configured to received the unregulated voltage and to generate a substantially constant direct current (DC) voltage. The LED integrated circuit controller also includes a current setting circuit configured to receive the substantially constant DC voltage and to provide a substantially constant direct current to drive a series of light emitting diodes, and a second depletion device configured to protect the LED integrated circuit controller from external high voltages. The LED integrated circuit controller further includes an overshoot voltage protection circuit configured to withstand input voltage up to 400 V, a thermal control circuit configured to protect the LED controller from overheating, and a pulse width modulation circuit configured to control dimming of the series of light emitting diodes.

In another embodiment, a method of controlling light emitting diodes (LEDs) in an integrated circuit includes receiving an alternating current power source with a LED integrated circuit controller, where the LED integrated circuit controller includes a voltage regulator circuit and a current setting circuit, and the voltage regulator circuit includes a depletion device and a band gap voltage reference circuit, generating a unregulated voltage using the depletion device, generating a band gap reference voltage based on the unregulated voltage using the band gap voltage reference circuit, generating a substantially constant direct current based on the band gap reference voltage using the current setting circuit, and driving one or more LEDs using the substantially constant direct current.

In yet another embodiment, a light emitting diode (LED) integrated circuit controller includes a voltage regulator circuit configured to operate with an alternating current (AC) power source, where the voltage regulator circuit includes a depletion device configured to receive a varying AC voltage and to generate a unregulated voltage, and a band gap voltage reference circuit configured to received the unregulated voltage and to generate a substantially constant direct current (DC) voltage. The LED integrated circuit controller also includes a current setting circuit configured to receive the substantially constant DC voltage and to provide a substantially constant direct current to drive multiple channels of light emitting diodes in parallel, and a second depletion device configured to protect the LED integrated circuit controller from external high voltages.

BRIEF DESCRIPTION OF THE DRAWINGS

The aforementioned features and advantages of the invention, as well as additional features and advantages thereof, will be more clearly understandable after reading detailed descriptions of embodiments of the invention in conjunction with the following drawings.

Like numbers are used throughout the specification.

DESCRIPTION OF EMBODIMENTS

Methods and circuits are provided for controlling LEDs. The following descriptions are presented to enable any person skilled in the art to make and use the invention. Descriptions of specific embodiments and applications are provided only as examples. Various modifications and combinations of the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the widest scope consistent with the principles and features disclosed herein.

Some portions of the detailed description that follows are presented in terms of flowcharts, logic blocks, and other symbolic representations of operations on information that can be performed on a computer system. A procedure, computer-executed step, logic block, process, etc., is here conceived to be a self-consistent sequence of one or more steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Figure 1:
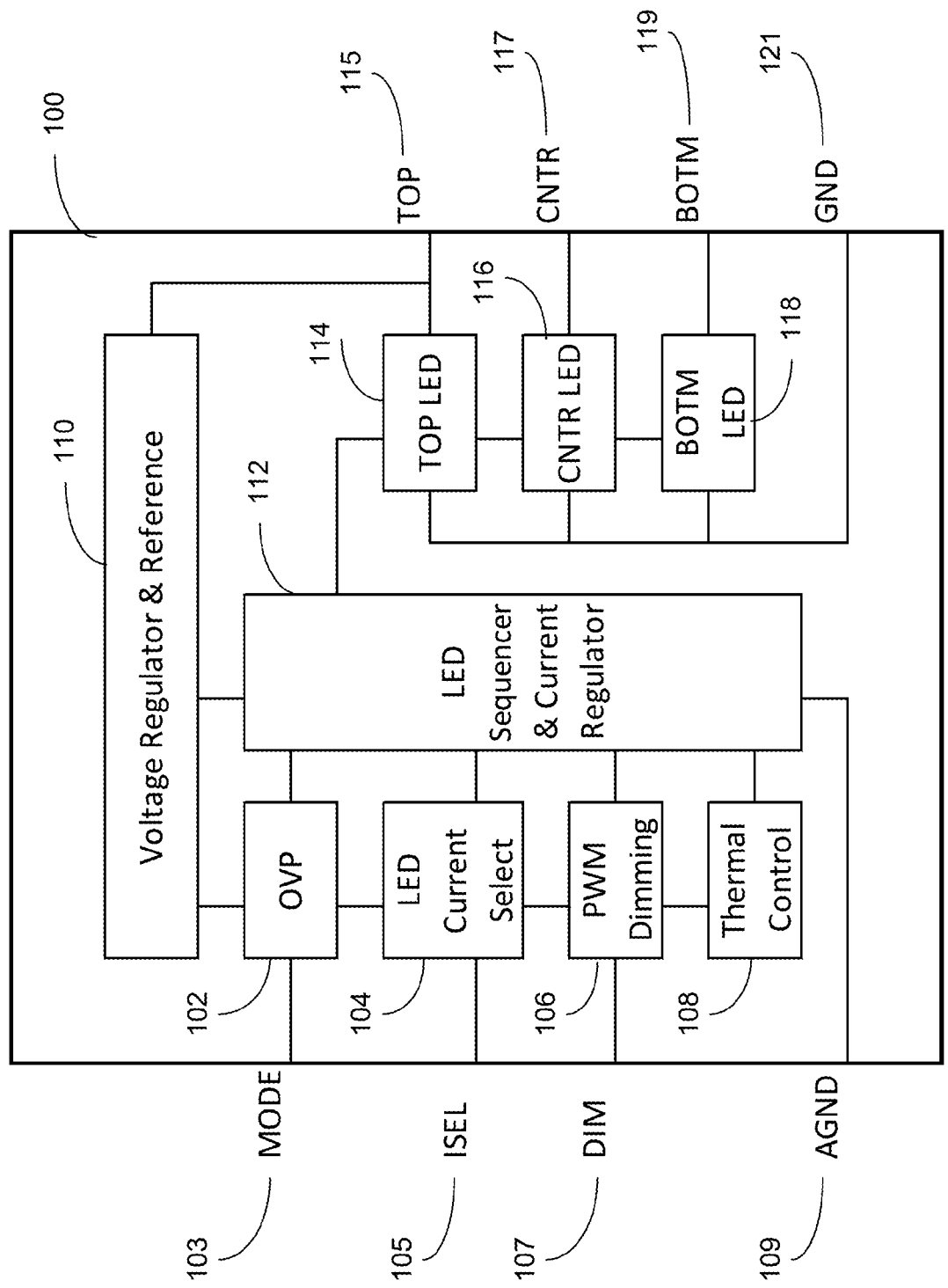
FIG. 1 illustrates a block diagram of a LED controller according to embodiments of the present invention.

FIG. 1 illustrates a block diagram of a LED controller according to embodiments of the present invention. As shown in FIG. 1, the LED controller 100 includes an overshoot voltage protection (OVP) unit 102, a LED current select unit 104, a pulse width modulation dimming unit 106, and a thermal control unit 108. The overshoot voltage protection unit 102 is coupled to a mode pin 103; the LED current select unit 104 is coupled to a current select pin (ISEL) 105; and the pulse width modulation unit 106 is coupled to a dimming control (DIM) pin 107.

The LED controller further includes a voltage regulator (and reference) unit 110, and a current regulator (and LED sequencer) unit 112, a top LED driver unit 114, a center LED driver unit 116, and a bottom LED driver unit 118. The top LED driver unit is coupled to a TOP pin 115; the center LED driver unit 116 is coupled to a center (CNTR) pin 117; and the bottom LED driver unit 118 is coupled to a bottom (BOTM) pin 119. The voltage regulator 110 is coupled to the overshoot voltage protection unit 102, the current regulator unit 112, and the TOP pin 115. The current regulator is coupled to the overshoot voltage protection unit 102, the LED current select unit 104, the pulse width modulation dimming unit 106, the thermal control unit 108, the top LED driver unit 114, the center LED driver unit 116, and the bottom LED driver unit 118. The current regulator 112 is also coupled to an analog ground (AGND) pin 109. The top LED driver unit 114, the center LED driver unit 116, and the bottom LED driver unit 118 are coupled to a digital ground (GND) pin 121.

The LED controller 100 supports both conventional TRIAC dimming, and pulse width modulation dimming. Built-in thermal regulation mechanism may be employed to linearly reduce the LED current when the driver's junction temperature exceeds a preprogrammed temperature, such as 100° C. They may also be configured to shut-down when the junction temperature reaches preprogrammed temperature, for example 150° C., to prevent the system from thermal runaway. The mode pin sets the driver's operating voltage to 110V AC or 220V AC environment. It protects the system from being damaged when power is applied incorrectly. The drivers can withstand up to 400 volts between the TOP and GND pins. It consumes about 150 uA of quiescent current.

Figure 2:
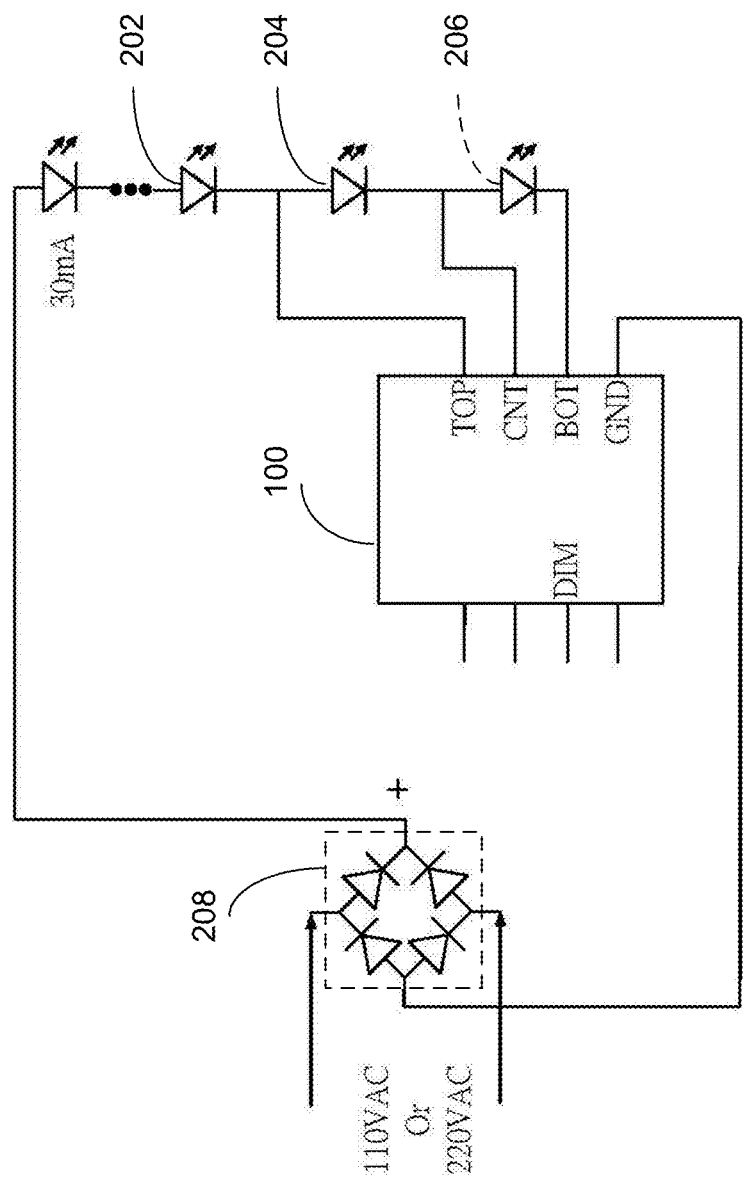
FIG. 2 illustrates an application of the LED controller of FIG. 1 according to an embodiment of the present invention.

FIG. 2 illustrates an application of the LED controller of FIG. 1 according to an embodiment of the present invention. In this exemplary implementation, the LED controller 100 is used to control a series of LEDs. In particular, the top pin 115, the center pin 117, and the bottom pin 119 of the LED controller 100 are coupled to output of LEDs 202, 204, and 206 respectively, in the series of LEDs. The digital ground pin 121 of the LED controller 100 is coupled to a rectifier 208 configured with four diodes. The rectifier may be configured to receive power from either 110V AC or 220V AC. The rectifier is also coupled to the top of the series of LEDs being controlled.

The LED controller 100 supports a series (also referred to as a string) of LEDs operating at a current of 30 mA. It may sink 30 mA of constant current and sequentially turns on/off the LED string sequentially according to pre-determined input voltages. The string of LEDs light up in the order of top, center, then bottom, and shut off in the reverse order when the LED string is powered directly from a full-wave rectifier off an AC line. The programmable LED current provides user the flexibility to adjust the LED current within a +/−10% range.

Figure 3:
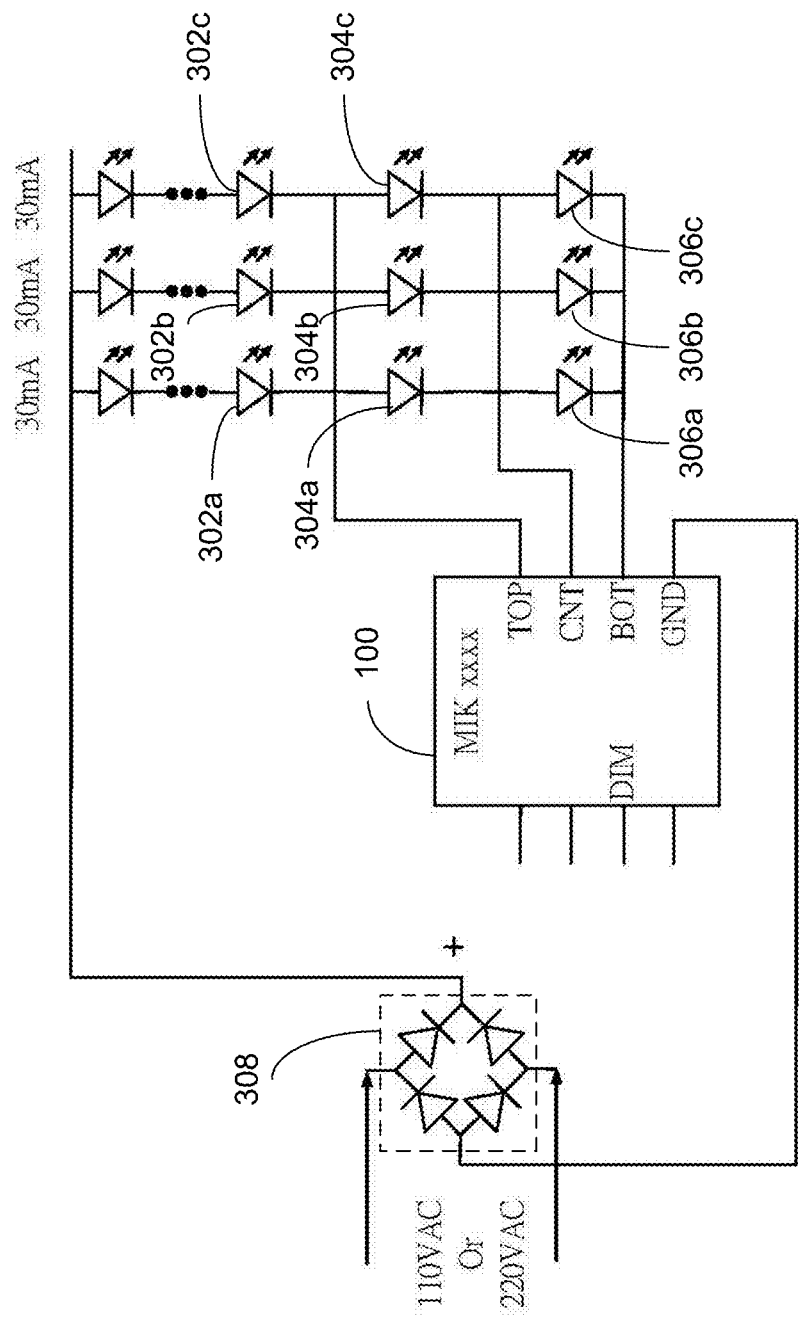
FIG. 3 illustrates another application of the LED controller of FIG. 1 according to an embodiment of the present invention.

FIG. 3 illustrates another application of the LED controller of FIG. 1 according to an embodiment of the present invention. In this exemplary implementation, the LED controller 100 is used to control three parallel strings of LEDs. In particular, the top pin 115 is coupled to output of LEDs 302a, 302b, and 302c from each of the three strings of LEDs. The center pin 117 is coupled to output of LEDs 304a, 304b, and 304c from each of the three strings of LEDs. The bottom pin 119 is coupled to output of LEDs 306a, 306b, and 306c from each of the three strings of LEDs as shown in FIG. 3. The digital ground pin 121 of the LED controller 100 is coupled to a rectifier 308 configured with four diodes. The rectifier 308 may be configured to receive power from either 110V AC or 220V AC. The rectifier 308 is also coupled to the top LED of each of the string of LEDs being controlled. This application supports three strings of LEDs with each string of LEDs operating at a current of about 30 mA, thus providing a combined output current of about 90 mA. Note that the LED controller 100 may deliver up to about 100 mA of LED current, and may be used for high power applications.

Figure 4:
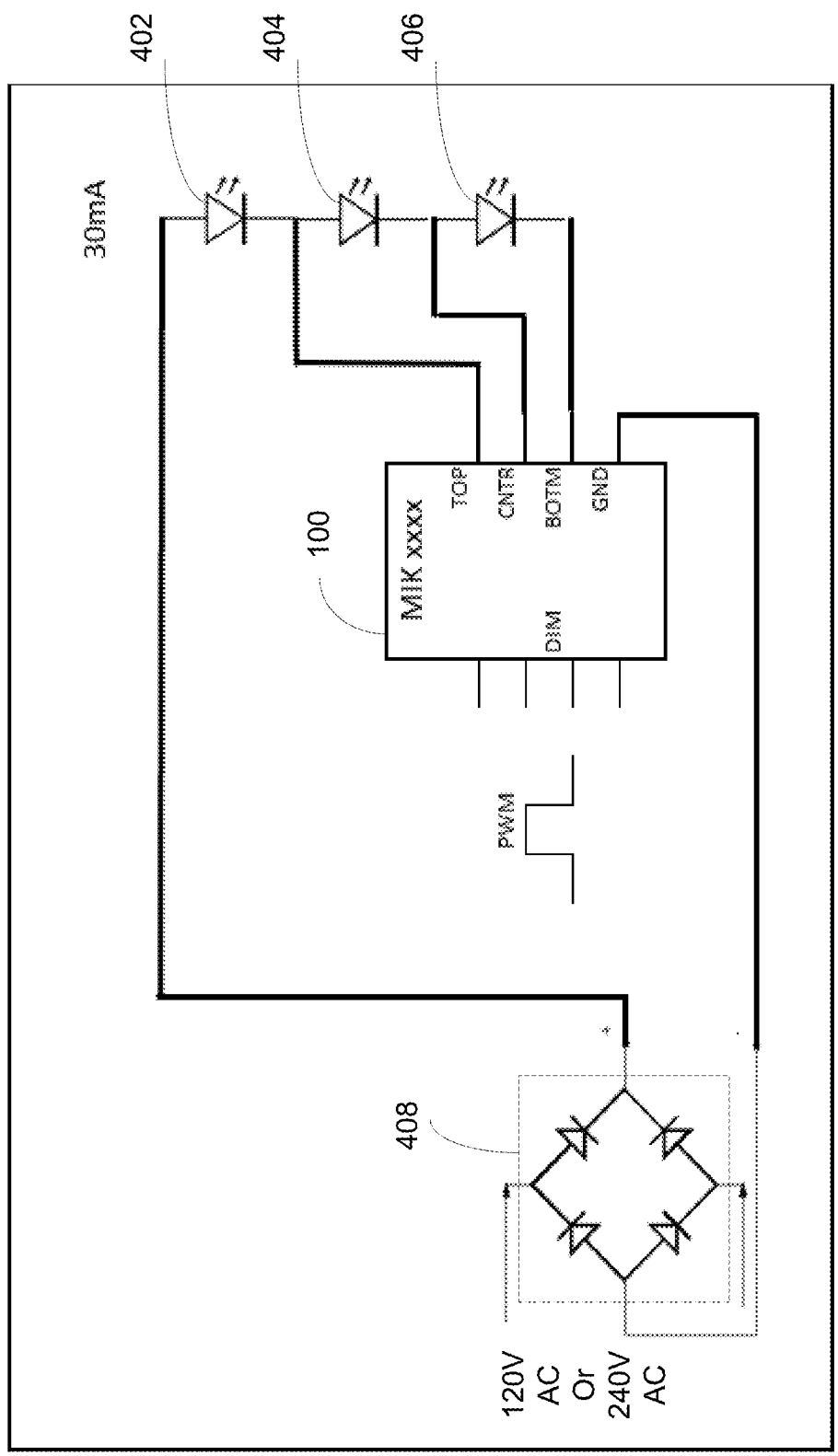
FIG. 4 illustrates yet another application of the LED controller of FIG. 1 according to an embodiment of the present invention.

FIG. 4 illustrates yet another application of the LED controller of FIG. 1 according to an embodiment of the present invention. The setup of this example is similar to that of the FIG. 2, except that a pulse width modulation signal is coupled to the DIM pin 107 of the LED controller 100. By using the pulse width modulation signal applied, the LED controller 100 is configured to control the dimming (or brightness) of the series of LEDs. In particular, the top pin 115 is coupled to output of LED 402. The center pin 117 is coupled to output of LED 404. The bottom pin 119 is coupled to output of LED 406. The digital ground pin 121 of the LED controller 100 is coupled to a rectifier 408 configured with four diodes as shown in FIG. 4. The rectifier 408 may be configured to receive power from either 120V AC or 240V AC. The rectifier 408 is also coupled to the top LED 402.

The following table lists pin definition of the LED controller according to embodiments of the present invention.

| Pin No. | Pin Name | Pin Descriptions |
|---|---|---|
| 1 | ISEL | Select LED current, HIGH: +10%, LOW: −10% |
| 2 | CNTR | Cathode of the center LED |
| 3 | BOTM | Cathode of the bottom LED |
| 4 | DIM | PWM dimming control input |
| 5 | MODE | Low: For 110 V, Open: For 220 V |
| 6 | GND | Power Ground |

-continued

| Pin No. | Pin Name | Pin Descriptions |
|---|---|---|
| 7 | TOP | Cathode of the top LED |
| 8 | AGND | Analog Ground |

The LED controller 100 may be implemented in a package of a SOP-8 exposed pad. Specifically, the current select (ISEL) pin 105 is assigned to pin 1; the center pin 117 is assigned to pin 2; the bottom pin 119 is assigned to pin 3, the dim pin 107 is assigned to pin 4, the mode pin 103 is assigned to pin 5; the digital ground (GND) pin 121 is assigned to pin 6; the top pin 115 is assigned to pin 7; and the analog ground (AGND) pin 109 is assigned to pin 8. A digital ground is applied to the center of the package, as shown with the dotted rectangle.

The following table lists exemplary electrical specifications of the LED controller.

| Parameter | Test Conditions | Symbol | Min | Typ | Max | Unit |
|---|---|---|---|---|---|---|
| Operating Voltage | | VTOP | 5 | | 400 | V |
| Quietsent Current | | IQ | | 150 | | uA |
| LED Current (MIKxxxx) | | ILEDx | | 30 | | mA |
| LED Current (MIKyyyy) | | ILEDy | | 100 | | mA |
| LED Current Accuracy | | | −10 | | 10 | % |
| LED Current Adjustment Range | | IADJ | −10 | | 10 | % |
| Thermal Regulation Onset | | TTR | | 100 | | °C. |
| Thermal Regulation | | ITR | | −2 | | %/°C. |
| Thermal Shut-down Temperature | | TOTP | | 150 | | °C. |
| PWM Dimming Pulse Amplitude | | VPWM | 0 | | 1.5 | V |
| Pull-down Current of MODE Pin | | IMODE | | 1 | | uA |

TJ = 25° C., unless otherwise specified

According to embodiments of the present invention, input voltage may be up to 400 volts (V). Operating ambient temperature range may be from −40° C. to 85° C. Operating junction temperature may be up to 150° C. Storage temperature may be from −65° C. to 150° C. Lead temperature may be up to 260° C. Thermal resistance junction to ambient may be up to 60° C./W.

Figure 5:
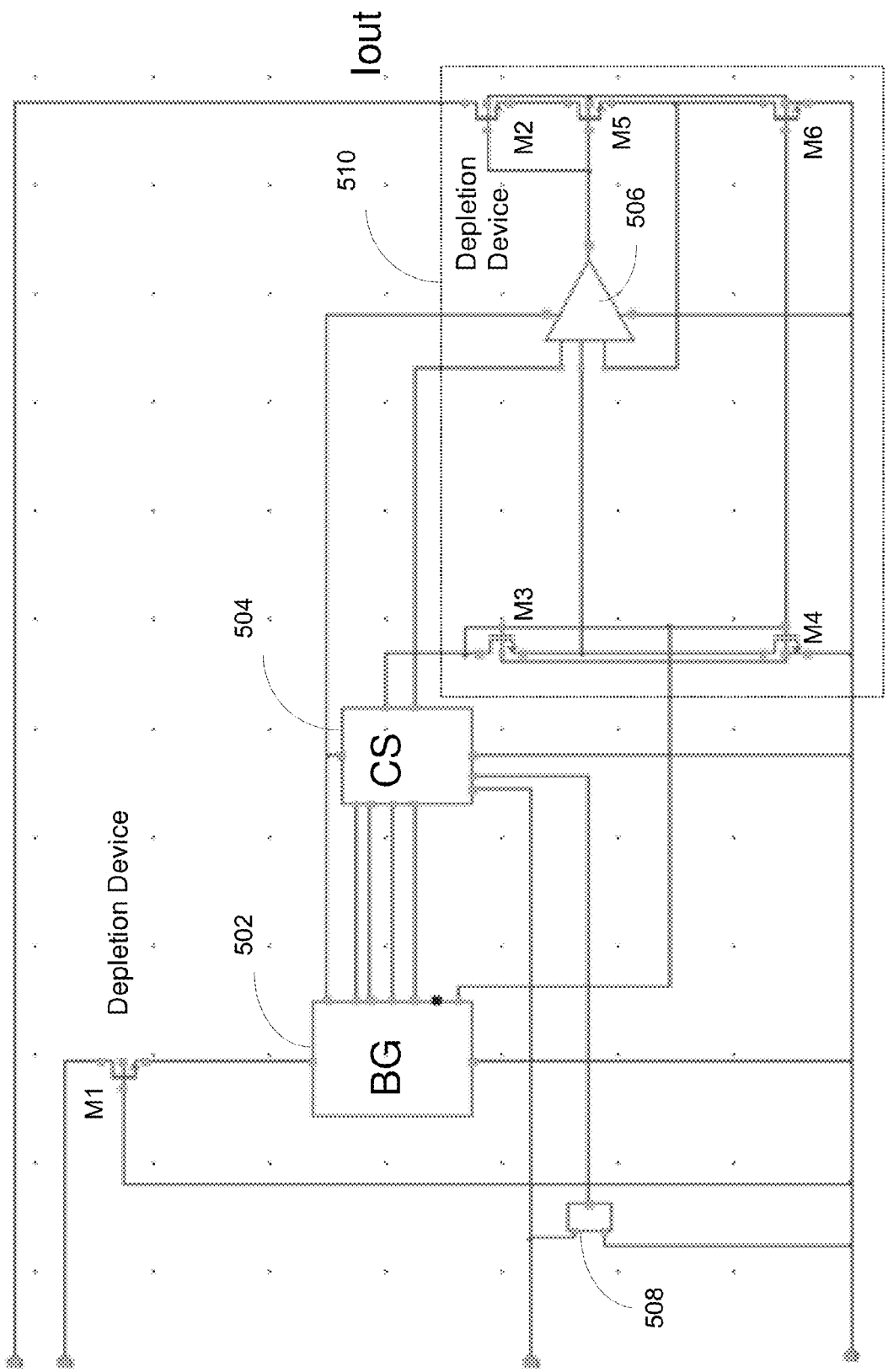
FIG. 5 illustrates an exemplary implementation of the disclosed LED controller according to embodiments of the present invention.

FIG. 5 illustrates an exemplary implementation of the LED integrated circuit controller according to embodiments of the present invention. In the example shown in FIG. 5, the LED integrated circuit control includes an input depletion device M1, an output depletion device M2, a band gap voltage reference circuit block 502, a current setting circuit block 504 (also referred to as current regulator circuit), an amplifier circuit 506, an electrostatic discharge (ESD) protection device 508, and metal oxide semiconductor field effect transistors (MOSFETs) M3, M4, M5, and M6 connected as shown in FIG. 5. According to embodiments of the present invention, the depletion devices M1 and M2 can be high voltage devices capable of handling high AC voltages such as 110V AC or 220V AC. On the other hand, the MOSFETs M3, M4, M5, and M6 can be low voltage devices with operating voltage less than 5V. The amplifier 506, together with MOSFETs M3, M4, M5, M6, and depletion device M2 performs the function of current multiplication as shown with the dotted box 510. The depletion device M1 is configured to receive a varying AC voltage and it in turn generates an unregulated voltage, for example about 7V. The depletion device M2 is configured to protect the LED integrated circuit controller from external high voltages. The band gap reference voltage circuit 502 is configured to received the unregulated voltage from the depletion device M1 and it generate a substantially constant direct current (DC) voltage (for example 5V with a range of deviation from 1% to 5% depending on design and manufacturing process variations) to be used by the current setting circuit block 504, which is also referred to as the current regulator circuit. The current setting circuit block 504 is configured to provide a substantially constant direct current, using the substantially constant DC voltage generated by the band gap reference voltage circuit 502, to the current multiplication block 510, which in turn drives a series of light emitting diodes.

Figure 6:
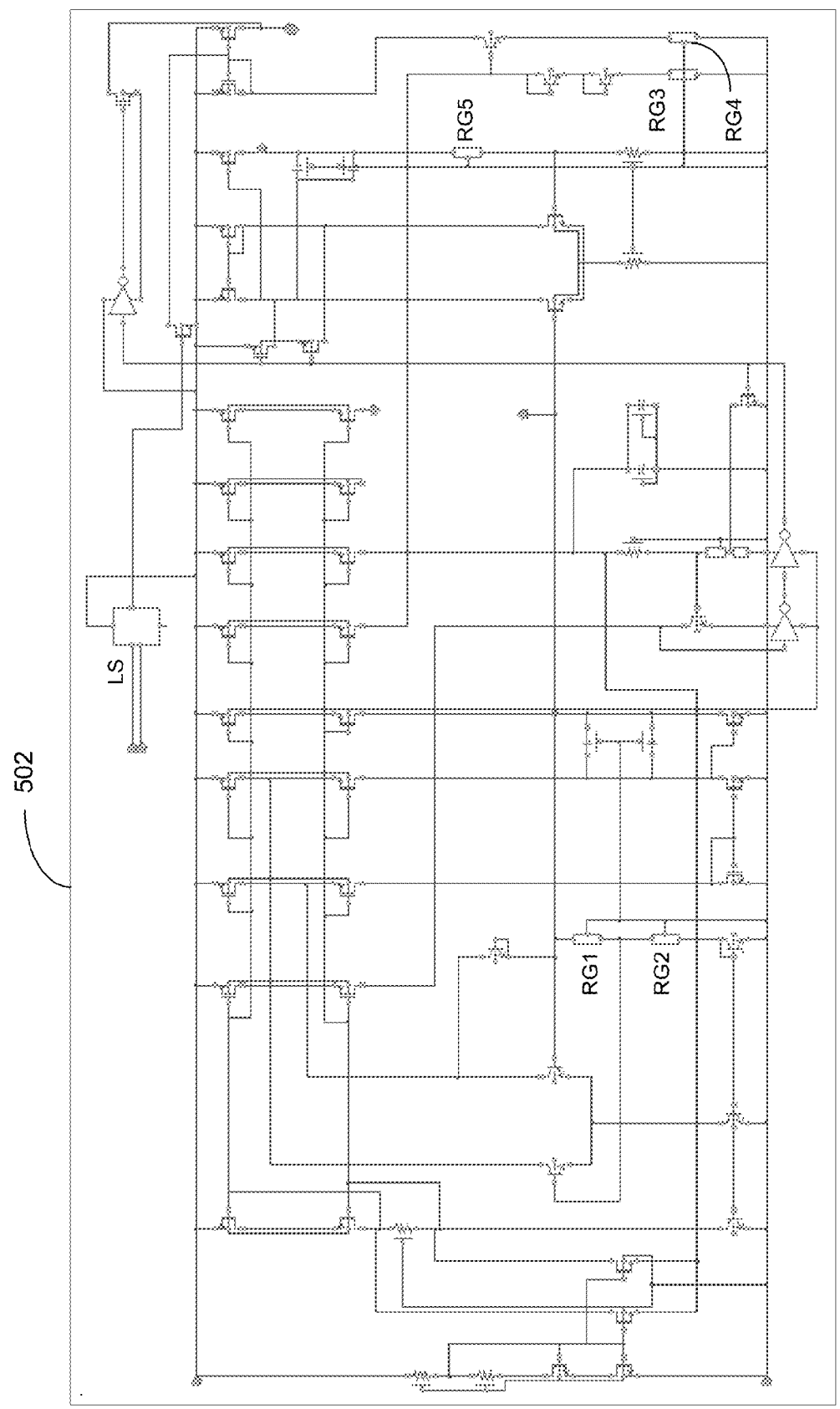
FIG. 6 illustrates an exemplary implementation of band gap voltage reference circuit of FIG. 5 according to embodiments of the present invention.

FIG. 6 illustrates an exemplary implementation of band gap voltage reference circuit of FIG. 5 according to embodiments of the present invention. In this exemplary implementation, the band gap voltage reference circuit includes MOSFETs, bipolar FETs, inverters, resistors, capacitors, level shifter circuit (LS), and resistors blocks RB1, RB2, RB3, RB4, and RB5 as shown in FIG. 6. According to embodiments of the present invention, the band gap voltage reference circuit 502 is a temperature independent voltage reference circuit implemented in integrated circuits, with an output voltage around 1.25 V, which is close to the theoretical 1.22 eV band gap of silicon at 0 K. According to embodiments of the present invention, voltage difference between two p-n junctions (for example diodes), operated at different current densities, can be used to generate a proportional to absolute temperature (PTAT) current in a first resistor. This current is then used to generate a voltage in a second resistor. This voltage in turn is added to the voltage of one of the junctions. The voltage across a diode operated at constant current, or here with a PTAT current, is complementary to absolute temperature (CTAT), with approx. −2 mV/K. The ratio between the first and second resistor is chosen such that the first order effects of the temperature dependency of the diode and the PTAT current can cancel out. The resulting voltage is about 1.2-1.3 V, depending on the particular technology and circuit design, and is close to the theoretical 1.22 eV band gap of silicon at 0 K. The remaining voltage change over the operating temperature of integrated circuits is on the order of a few millivolts. This temperature dependency can have a parabolic behavior.

Since the output voltage is fixed around 1.25 V for typical band gap reference circuits, the minimum operating voltage can be about 1.4 V, as in a CMOS circuit at least one drain-source voltage of a FET (field effect transistor) has to be added. Therefore, in one approach, currents are summed instead of voltages, resulting in a lower theoretical limit for the operating voltage.

Figure 7:
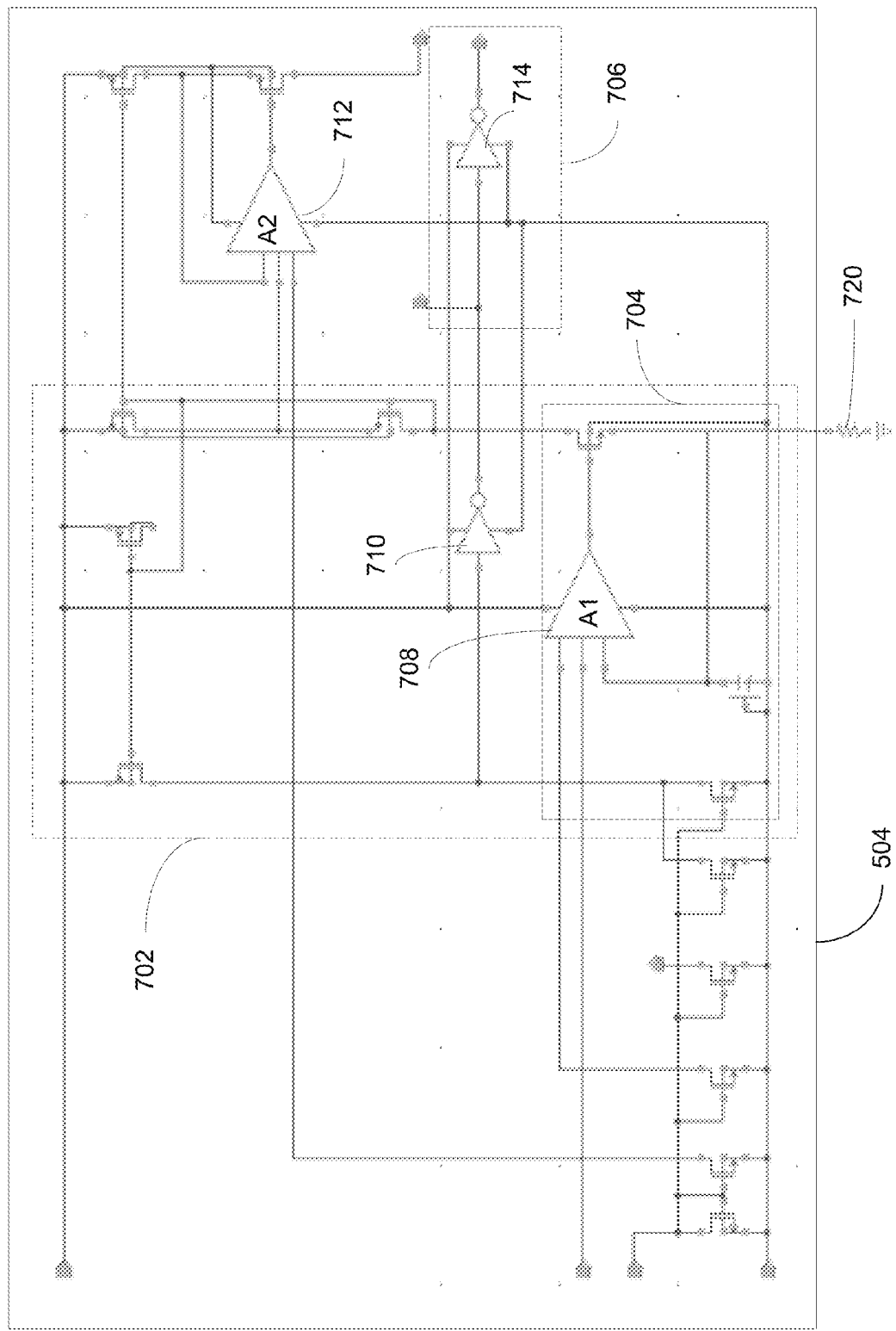
FIG. 7 illustrates an exemplary implementation of current setting circuit of FIG. 5 according to embodiments of the present invention.

FIG. 7 illustrates an exemplary implementation of current setting circuit of FIG. 5 according to embodiments of the present invention. In this example, the current setting circuit 504 includes circuits for current mode detection 702, which in turn includes circuits for providing programmable control of current 704, and circuits for detecting signal output to the band gap voltage reference circuit 502. At the circuit components level, the current setting circuit 504 includes amplifiers 708 (A1) and 712 (A2), inverters 710 and 714, capacitors, and multiple MOSFETs as shown in FIG. 7. One or more external resistor(s) 720 may be coupled to the current setting circuit 504 to perform the functions of 1) mode detection in the case of adjustable current mode, and 2) programming the current level in accordance with whether the one or more external resistor(s) exists, and the resistance value of the one or more external resistor(s). The circuit block 704 is configured to generate a stable, controllable, and programmable current.

There are numerous benefits with the disclosed LED controller. First, it can operate with either 110V AC or 220V AC power source, which enables the LED controller to be used in a wide range of applications. The LED controller is able to turn on/off a series of LEDs sequentially. It supports user programmable LED current, as well as both a triode alternating current (TRIAC) and pulse width modulation (PWM) dimming architectures. Furthermore, it performs thermal regulation with built-in thermal detection and thermal shut-down capabilities. The LED controller may withstand up to 400 volts input voltage, with input overshoot voltage protection. It operates with low quiescent current and high efficiency.

Figure 8:
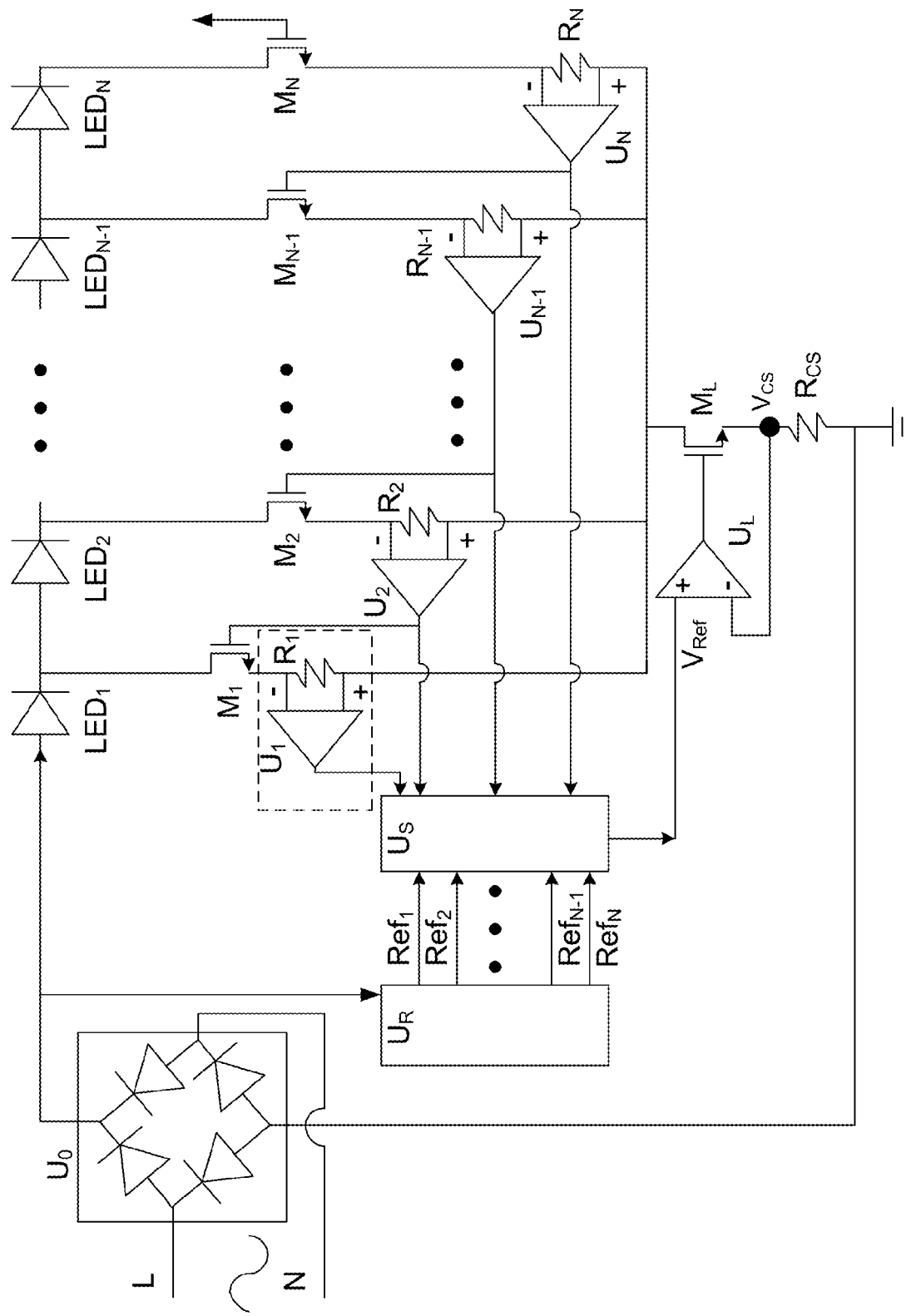
FIG. 8 illustrates an exemplary implementation of a multi-stage LED driver according to aspects of the present disclosure.

FIG. 8 illustrates an exemplary implementation of a multi-stage LED driver according to aspects of the present disclosure. As shown in FIG. 8, $U_0$ may be a full bridge rectifier. $LED_1$, $LED_2$ ... $LED_{N-1}$, and $LED_N$ may be a sequence of LEDs connected in series. $M_1$, $M_2$ ... $M_{N-1}$, and $M_N$ may be high voltage N-channel MOSFETs. $M_L$ may be a low voltage N-channel MOSFET. According to aspects of the present disclosure, P-channel MOSFETs or other types of transistors may be used in place of the N-channel MOSFETs. $U_1$, $U_2$ ... $U_{N-1}$, and $U_N$ may be current sensing comparators. $R_1$, $R_2$ ... $R_{N-1}$, and $R_N$ may be one or more current sensing resistors. $R_{CS}$ may be one or more current setting resistors. $U_L$ may be a current setting amplifier. $Ref_1$, $Ref_2$ ... $Ref_{N-1}$, and $Ref_N$ may be reference voltages generated by $U_R$ from a band gap voltage reference circuit. Note that the gate terminal of $M_N$ may be connected to an unregulated voltage as described above in association with FIG. 5. In a particular implementation, $Ref_1$, $Ref_2$ ... $Ref_{N-1}$, and $Ref_N$ may be related to each other in a sequentially incrementing manner, such as $Ref_1 < Ref_2 ... < Ref_{N-1} < Ref_N$. $U_S$ may be a sensing control circuit configured to select one of $Ref_1$, $Ref_2$ ... $Ref_{N-1}$, and $Ref_N$ as an output of the sensing control circuit. In one particular implementation, $U_S$ may be a multiplexor whose output may be equal to one of the input $Ref_1$, $Ref_2$ ... $Ref_{N-1}$ or $Ref_N$ based on the output of $U_1$, $U_2$ ... $U_{N-1}$, and $U_N$. In the particular implementation, the default output can be set to $Ref_1$. Note that $Ref_1$, $Ref_2$ ... $Ref_{N-1}$, and $Ref_N$ may be generated by the band gap reference circuit as described above in association with FIG. 5 and FIG. 6, which can be independent of voltage and temperature variation. In one particular implementation, after a reference voltage is generated by the band gap reference circuit, Once the bandgap is generated, all other reference voltage can be generated by resistor divider. For example, a string of unit resistors can be connected from the band gap reference voltage and the ground and $Ref_1$ to $Ref_N$ can be generated by tapping to different point along the string of unit resistors.

In this exemplary implementation, when a rectified AC voltage is applied, $LED_1$ may first be turned on while $LED_2$, ... $LED_{N-1}$, and $LED_N$ remain off. With $LED_1$ being turned on, current may pass through $LED_1$, $M_1$, $M_L$, and $R_{CS}$, and the current may be approximately equal to $Ref_1/R_{CS}$. As current passes through $M_1$, $U_1$ can sense the current passing through $R_1$ and outputs a signal to cause the output of the sensing control circuit $U_S$ to select $Ref_1$ In some implementations, $U_1$, and $R_1$ may be bypassed or removed (as indicated by the dotted lines), when the default reference voltage $V_{Ref}$ is selected to be $Ref_1$.

As the rectified AC voltage continues to increase, $LED_2$ may be turned on while $LED_3$, ... $LED_{N-1}$, and $LED_N$ remain off. With $LED_2$ being turned on, current may pass through $LED_1$, $LED_2$, $M_2$, $M_L$, and $R_{CS}$, and the current may be approximately equal to $Ref_2/R_{CS}$. As current passes through $M_2$, $U_2$ can sense the current passing through $R_2$ and outputs a signal to turn off $M_1$ and change the output of the sensing control circuit $U_S$ to select $Ref_2$.

As the rectified AC voltage continues to increase, the process described above may be repeated, as each of the LED and its corresponding channel may be turned on sequentially. For example, $LED_{N-1}$ may be turned on while $LED_N$ remain off. With $LED_{N-1}$ being turned on, current may pass through $LED_1$, $LED_2$ ... $LED_{N-1}$, $M_{N-1}$, $M_L$, and $R_{CS}$, and the current may be approximately equal to $Ref_{N-1}/R_{CS}$. As current passes through $M_{N-1}$, $U_{N-1}$ can sense the current passing through $R_{N-1}$ and outputs a signal to turn off the previous stage ($M_{N-2}$ not shown) and change the output of the sensing control circuit $U_S$ to select $Ref_{N-1}$ In addition, as the rectified AC voltage continues to increase, $LED_N$ may be turned on. With $LED_N$ being turned on, current may pass through $LED_1$, $LED_2$ ... $LED_{N-1}$, $LED_N$, $M_N$, $M_L$, and $R_{CS}$, and the current may be approximately equal to $Ref_N/R_{CS}$. As current passes through $M_N$, $U_N$ can sense the current passing through $R_N$ and outputs a signal to turn off $M_{N-1}$ and change the output of the sensing control circuit $U_S$ to select $Ref_N$.

After the rectified AC voltage reaches a peak value, it may start to decrease. As the rectified AC voltage decreases, the current passing through $LED_N$ may be reduced to a certain level and may eventually turn off $LED_N$. The current sensing comparator $U_N$ can sense the current reduction in $R_N$ and outputs a signal to change the output of the sensing control circuit $U_S$ to select $Ref_{N-1}$ and may cause $M_{N-1}$ to be turned on. This may cause the current to pass through $LED_1$, $LED_2$ ... $LED_{N-1}$, $M_{N-1}$, $M_L$, and $R_{CS}$, and the current may be approximately equal to $Ref_{N-1}/R_{CS}$. As the rectified AC voltage continues to decrease, the process described above may repeat, as each of the LED and its corresponding channel may be turned off sequentially until $LED_1$ turns off due to insufficient voltage applied to $LED_1$.

In the exemplary implementation of FIG. 8, as the magnitude of rectified AC voltage goes through the cycles of increasing and decreasing, the multi-stage LED driver circuit of FIG. 8 may be configured to turn on the plurality of LEDs sequentially from $LED_1$ to $LED_N$ as the rectified AC voltage increases, and to turn off the plurality of LEDs sequentially from $LED_N$ to $LED_1$ as the rectified AC voltage decreases. As a result, the current consumption of the plurality of LEDs may be matched to the profile of the rectified AC voltage applied, and the energy usage may be optimized.

Figure 9:
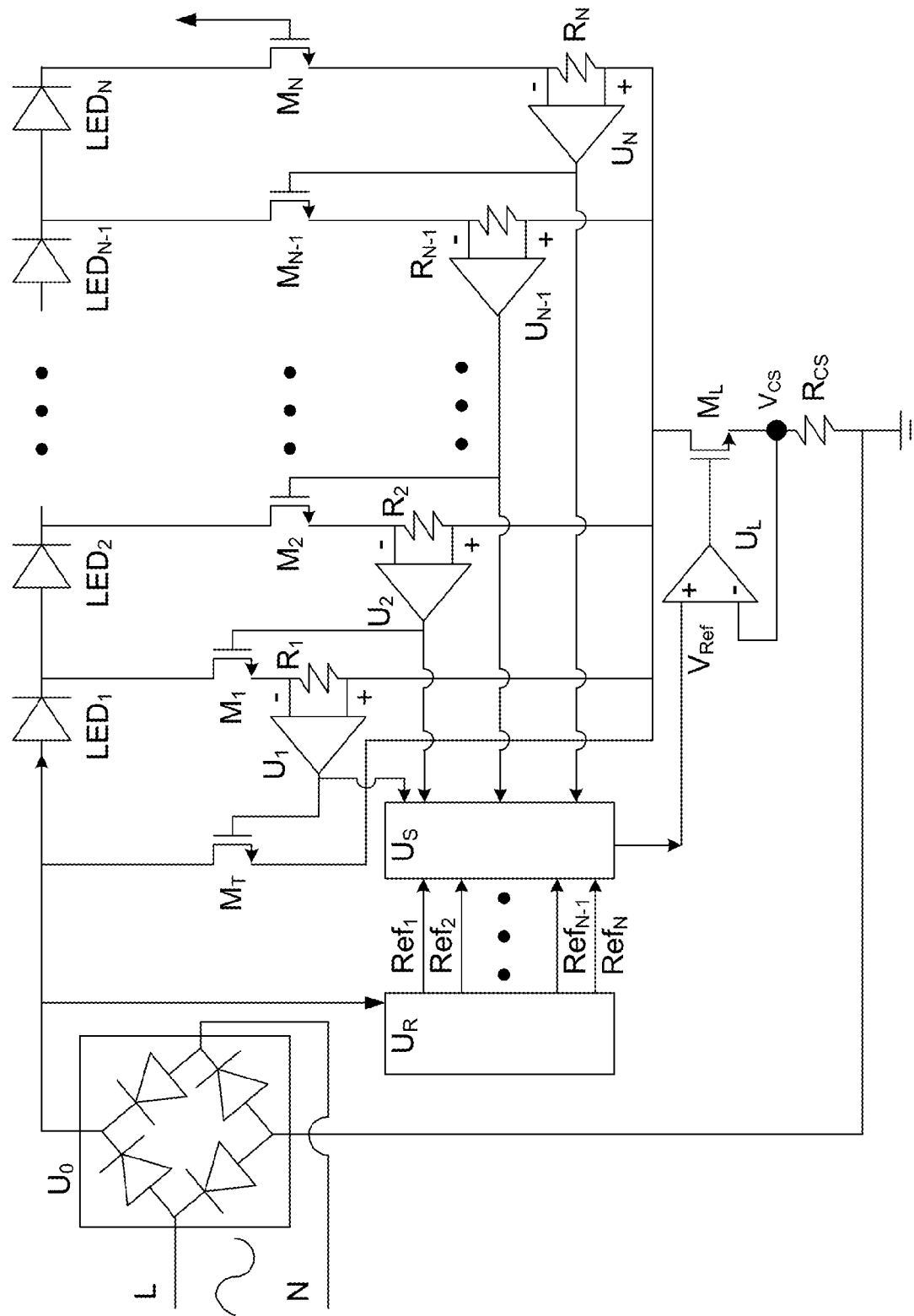
FIG. 9 illustrates an exemplary implementation of a multi-stage LED driver of FIG. 8 with a TRIAC dimmer circuit according to aspects of the present disclosure.

FIG. 9 illustrates an exemplary implementation of a multi-stage LED driver of FIG. 8 with a TRIAC dimmer circuit according to aspects of the present disclosure. In the example shown in FIG. 9, majority of the components are the same as that of FIG. 8 except $M_T$ is added to the circuit of FIG. 8. The operation of this circuit is also substantially the same as that of FIG. 8.

The TRIAC dimmer needs some current in order to maintain a conduction mode. A minimum current needed for the TRIAC dimmer to maintain the conduction mode is call the holding current. According to aspects of the present disclosure, $M_T$ is added so that holding current condition is met when $LED_1$, $LED_2$ ... $LED_{N-1}$, and $LED_N$ are turned off.

Figure 10:
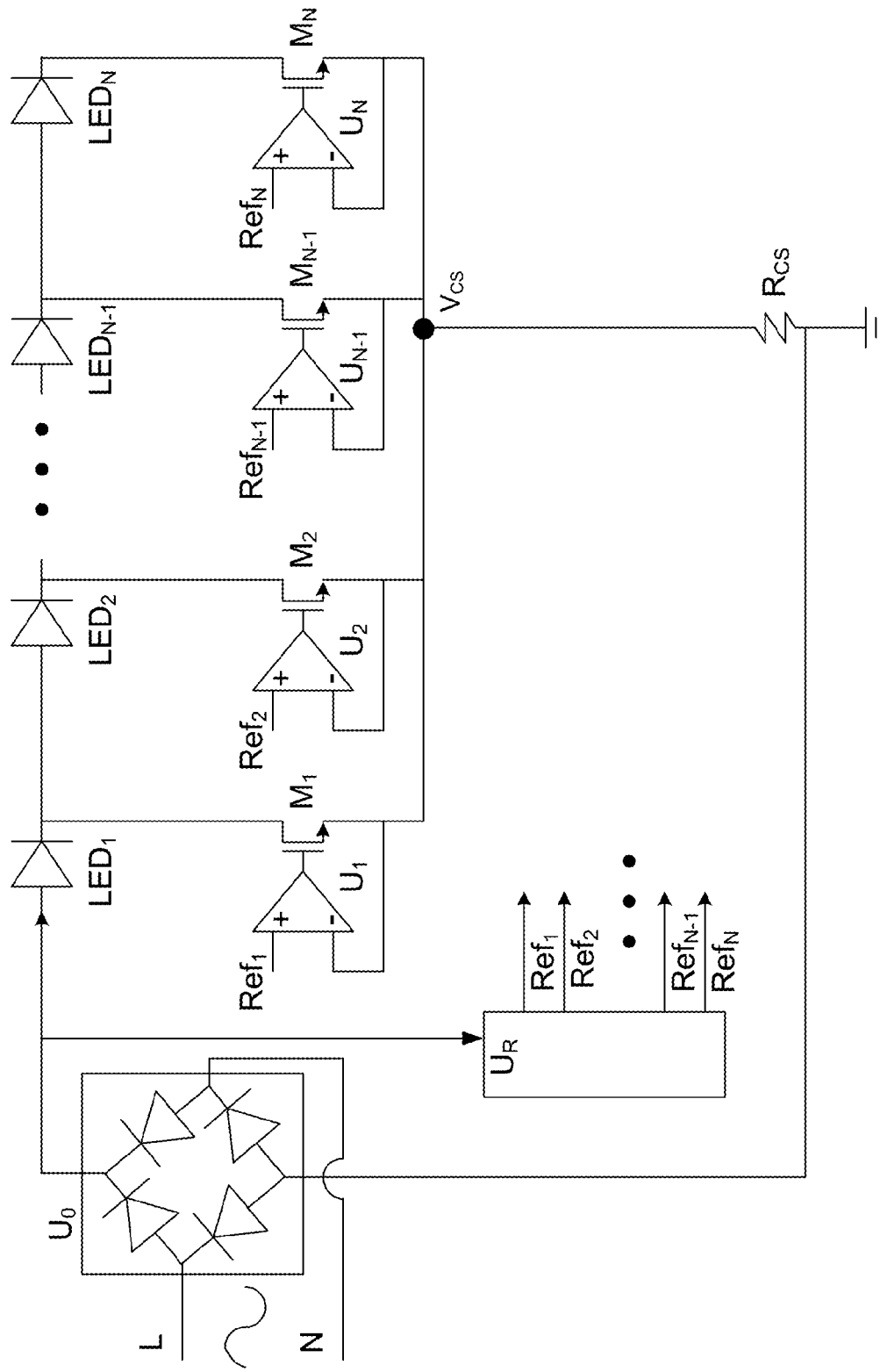
FIG. 10 illustrates another exemplary implementation of a multi-stage LED driver according to aspects of the present disclosure.

FIG. 10 illustrates another exemplary implementation of a multi-stage LED driver according to aspects of the present disclosure. In the exemplary implementation shown in FIG. 10, $U_0$ may be an external full wave bridge rectifier. $LED_1$, $LED_2$ ... $LED_{N-1}$, and $LED_N$ may be an external sequence of LEDs connected in series and being driven by a multi-stage LED driver circuit. $M_1$, $M_2$ ... $M_{N-1}$, and $M_N$ may be high voltage MOSFETs. $U_1$, $U_2$ ... $U_{N-1}$, and $U_N$ may operate as error amplifiers. $R_{CS}$ may be one or more current setting resistors. $Ref_1$, $Ref_2$ ... $Ref_{N-1}$, and $Ref_N$ may be reference voltages generated by $U_R$ from a band gap reference voltage. In some implementations, $Ref_1$, $Ref_2$ ... $Ref_{N-1}$, and $Ref_N$ may be related to each other in a sequentially incrementing manner, such as $Ref_1 < Ref_2 ... < Ref_{N-1} < Ref_N$, with $Ref_1$ being the lowest reference voltage and $Ref_N$ being the highest reference voltage.

In this exemplary implementation, when an AC voltage is applied to the input of the rectifier $U_0$, the voltage at the output of the rectifier starts to increase. At some point, the voltage across $LED_1$ is sufficient to turn on $LED_1$ and a current through the $LED_1$ flows through $M_1$ and $R_{CS}$. $LED_2$ ... $LED_{N-1}$ and $LED_N$ are off at this point since the rectified voltage is not sufficient to turn them on. $U_1$, $M_1$ and $R_{CS}$ together with a reference voltage $Ref_1$ form a current setting look that sets the current to $V_{CS}/R_{CS}$, which may be approximately equal to $Ref_1/R_{CS}$ at this point.

As the rectified AC voltage continues to increase, $LED_2$ may gain enough voltage across it and $LED_2$ may be turned on. As a result, current may flow through $M_2$ and $R_{CS}$. The error amplifier $U_2$ may force $V_{CS}$ to increase from $Ref_1$ to $Ref_2$. As $V_{CS}$ increases, it may be greater than $Ref_1$, since $Ref_2$ is greater than Ref1. Since the negative input of the error amplifier $U_1$ is higher than its positive input, the output of error amplifier $U_1$ swing low and causing $M_1$ to be turned off. Current may then flow through $LED_1$, $LED_2$, $M_2$ and $R_{CS}$.

The process may be repeated for the rest of the LEDs. For example, when $LED_{N-1}$ gains enough voltage to turn on $LED_{N-1}$, $M_{N-1}$ may be turned on and the previous stage ($M_{N-2}$, not shown) may be turned off. Similarly, when $M_N$ is turned on, $M_{N-1}$ may be turned off.

When the rectified AC voltage reaches the peak, it may start to decrease. When the rectified AC voltage decreases to certain point, where $LED_N$ may not have enough voltage to be fully turned on, and current in $M_N$ may reduce and $V_{CS}$ may also be reduced due to insufficient current flowing through $R_{CS}$. At some point, $LED_N$ would be turned off, and $V_{CS}$ would be reduced to $Ref_{N-1}$ level. When $V_{CS}$ drops below $Ref_{N-1}$, $M_N$ would be turned on and $V_{CS}$ would be regulated to $Ref_{N-1}$ by $U_{N-1}$. Current may then flow through $LED_1$, $LED_2$ ... $LED_{N-1}$, $M_{N-1}$ and $R_{CS}$.

As the rectified AC voltage continues to decrease, $LED_{N-1}$ may start to turn off and $V_{CS}$ may be further reduced due to insufficient current flowing through $R_{CS}$. When $LED_{N-1}$ is off, $V_{CS}$ may be dropped to $Ref_2$ level, and when $V_{CS}$ drops below $Ref_2$, $M_2$ may start to conduct current at a level of $Ref_2/R_{CS}$, current path may then be flowing through $LED_1$, $LED_2$, $M_2$ and $R_{CS}$. As the rectified AC voltage continues to decrease, $LED_2$ and $LED_1$ may also be turned off, for the similar reasons described above between the stage N and N-1.

In the exemplary implementation of FIG. 8, as the magnitude of rectified AC voltage goes through the cycles of increasing and decreasing, the multi-stage LED driver circuit of FIG. 10 may be configured to turn on the plurality of LEDs sequentially from $LED_1$ to $LED_N$ as the rectified AC voltage increases, and to turn off the plurality of LEDs sequentially from $LED_N$ to $LED_1$ as the rectified AC voltage decreases. As a result, the current consumption of the plurality of LEDs may be matched to the profile of the rectified AC voltage applied, and the energy usage may be optimized.

Figure 11:
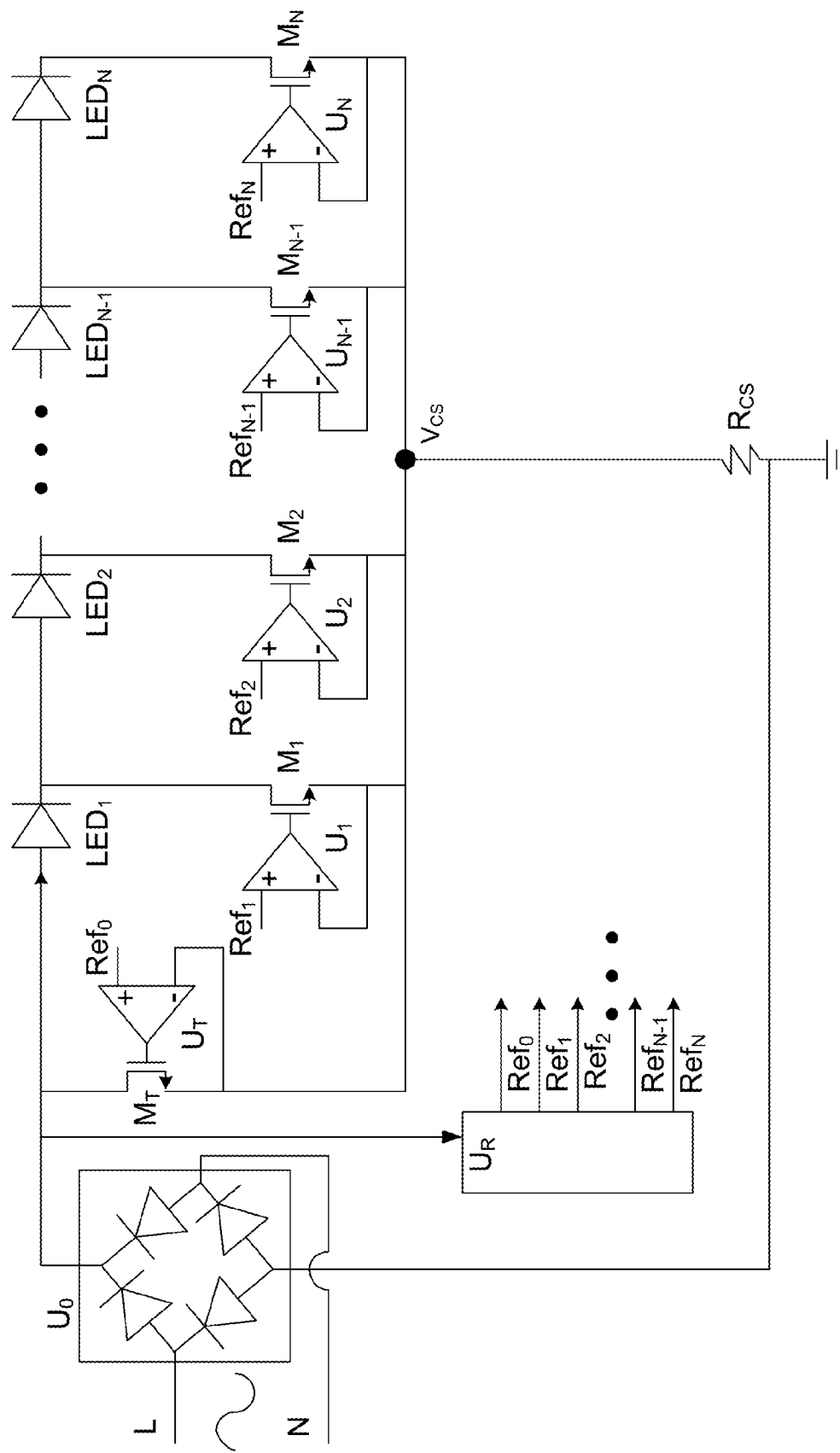
FIG. 11 illustrates an exemplary implementation of a multi-stage LED driver of FIG. 10 with a TRIAC dimmer circuit according to aspects of the present disclosure.

FIG. 11 illustrates an exemplary implementation of a multi-stage LED driver of FIG. 10 with a TRIAC dimmer circuit according to aspects of the present disclosure. As shown in the exemplary implementation of FIG. 11, majority of the components are the same as that of FIG. 10 except $M_T$ and $U_T$ have been added to the circuit of FIG. 10. The operation of this circuit may also be substantially similar to that of FIG. 10.

The TRIAC dimmer may require some current in order to maintain a conduction mode. A minimum current needed for the TRIAC dimmer to maintain the conduction mode is call the holding current. When the rectified AC voltage may be low, all LEDs may be turned off and no holing current can be provided to the TRIAC dimmer by the LEDs. According to aspects of the present disclosure, $M_T$ and $U_T$ can be added so that holding current condition can be met with $Ref_0$ when $LED_1$, $LED_2$ ... $LED_{N-1}$, and $LED_N$ are turned off.

The invention can be implemented in any suitable form, including hardware, software, firmware, or any combination of these. The invention may optionally be implemented partly as computer software running on one or more data processors and/or digital signal processors. The elements and components of an embodiment of the invention may be physically, functionally, and logically implemented in any suitable way. Indeed, the functionality may be implemented in a single unit, in a plurality of units, or as part of other functional units. As such, the invention may be implemented in a single unit or may be physically and functionally distributed between different units and processors.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as suited to the particular use contemplated.

What is claimed is:
1. A multistage light emitting diode (LED) driver for driving a plurality of serially connected LEDs, comprising:
    a voltage regulator circuit configured to receive a rectified AC voltage, wherein the voltage regulator circuit includes a depletion device configured to generate a unregulated voltage using the rectified AC voltage;
a band gap voltage reference circuit configured to generate a plurality of reference voltages using the unregulated voltage; and
a current setting circuit configured to control the plurality of serially connected LEDs using the plurality of reference voltages, wherein the current setting circuit comprises a plurality of current control units corresponding to the plurality of serially connected LEDs, wherein a current control unit in the plurality of current control units comprises:
an input terminal coupled to an output of a corresponding LED in the plurality of serially connected LEDs;
a control terminal coupled to a next stage comparator output terminal or coupled to a predetermined reference voltage;
a first output terminal coupled to a previous stage in the plurality of current control units;
a second output terminal coupled to other second output terminals of the plurality of current control units;
a transistor having a drain terminal coupled to the input terminal; a gate terminal coupled to the control terminal; and a source terminal;
a comparator having a negative terminal, a positive terminal and a comparator output terminal, wherein the comparator output terminal is coupled to the first output terminal; and
a resistor coupled between the negative terminal and the positive terminal of the comparator, wherein the positive terminal of the comparator is coupled the second output terminal of the current control unit.

2. The multistage LED driver of claim 1, wherein the plurality of reference voltages have sequentially differential values.

3. The multistage LED driver of claim 1, wherein the current setting circuit further comprises:
a sensing circuit configured to generate a derived reference using comparator outputs from the plurality of current control units and the plurality of reference voltages.

4. The multistage LED driver of claim 3, wherein the current setting circuit further comprises:
a first terminal configured to receive a current from the second output terminal of the plurality of current control units;
a second terminal configured to provide a feedback of the current from the plurality of current control units;
a third terminal configured to receive the derived reference voltage generated from the sensing circuit;
a transistor having a drain terminal coupled to the first terminal; a gate terminal; and a source terminal coupled to the second terminal;
an error sensing amplifier having a negative terminal, a positive terminal and an error sensing output terminal, wherein the error sensing output terminal is coupled to the gate terminal of the transistor; and
a current setting resistor coupled between the second terminal and a circuit ground.

5. The multistage LED driver of claim 4, wherein the current setting circuit further comprises:
a dimming transistor having a drain terminal coupled to an input of a first LED in the plurality of serially connected LEDs; a gate terminal coupled to a comparator output terminal of a first stage associated with the first LED in the plurality of serially connected LEDs; and a source terminal coupled to the output terminals of the plurality of current control units, wherein the dimming transistor is configured to conduct current while the plurality of serially connected LEDs are turned off.

6. A method for controlling a plurality of serially connected LEDs, comprising:
receiving a rectified AC voltage by a voltage regulator circuit, wherein the voltage regulator circuit includes a depletion device configured to generate a unregulated voltage using the rectified AC voltage;
generating a plurality of reference voltages by a band gap voltage reference circuit using the unregulated voltage; and
controlling the plurality of serially connected LEDs by a current setting circuit using the plurality of reference voltages, including controlling the plurality of serially connected LEDs using a plurality of current control units,
wherein controlling the plurality of serially connected LEDs using a plurality of current control units further comprises:
providing an input terminal coupled to an output of a corresponding LED in the plurality of serially connected LEDs, a control terminal coupled to a next stage comparator output terminal or coupled to a predetermined reference voltage, a first output terminal coupled to a previous stage in the plurality of current control units, and a second output terminal coupled to other second output terminals of the plurality of current control units;
providing a resistor coupled between the negative terminal and the positive terminal of a comparator, wherein the positive terminal of the comparator is coupled the second output terminal of the current control unit;
providing a transistor having a drain terminal coupled to the input terminal; a gate terminal coupled to the control terminal; and a source terminal;
comparing voltage difference between the negative terminal and the positive terminal of the comparator, wherein a comparator output terminal is coupled to the first output terminal; and
generating a control signal to turn off a previous stage in response to the voltage at the negative terminal is higher than the voltage at the positive terminal.

7. The method of claim 6, wherein the plurality of reference voltages have sequentially differential values.

8. The method of claim 6, wherein controlling the plurality of serially connected LEDs further comprises:
generating a derived reference by a sensing circuit using comparator outputs from the plurality of current control units and the plurality of reference voltages.

9. The method of claim 8, wherein controlling the plurality of serially connected LEDs further comprises:
providing a first terminal configured to receive a current from the second output terminal of the plurality of current control units, a second terminal configured to provide a feedback of the current from the plurality of current control units, a third terminal configured to receive the derived reference voltage generated from the sensing circuit, and a current setting resistor coupled between the second terminal and a circuit ground;
providing a transistor having a drain terminal coupled to the first terminal; a gate terminal; and a source terminal coupled to the second terminal;

equalizing the derived reference voltage with a current setting voltage across the current setting resistor using an error sensing amplifier, wherein the error sensing amplifier having a negative terminal, a positive terminal and an error sensing output terminal, wherein the error sensing output terminal is coupled to the gate terminal of the transistor; and causing current to flow through the transistor in response to the derived reference voltage being larger than the current setting voltage across the current setting resistor.

10. The method of claim 9, wherein the current setting circuit further comprises:

causing a dimming transistor to conduct current while the plurality of serially connected LEDs are turned off, wherein the dimming transistor having a drain terminal coupled to an input of a first LED in the plurality of serially connected LEDs; a gate terminal coupled to a comparator output terminal of a first stage associated with the first LED in the plurality of serially connected LEDs; and a source terminal coupled to the output terminals of the plurality of current control units.

\* \* \* \* \*